(12) United States Patent
Roy

(10) Patent No.: US 6,636,487 B1
(45) Date of Patent: Oct. 21, 2003

(54) APPARATUS AND METHOD FOR PROVIDING MULTIMEDIA CONFERENCING SERVICES WITH AN UNSPECIFIED BIT RATE QUALITY OF SERVICE CLASS OVER AN ASYNCHRONOUS TRANSFER MODE NETWORK

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/358,534

(22) Filed: Jul. 22, 1999

Related U.S. Application Data

(60) Provisional application No. 60/112,566, filed on Dec. 16, 1998.

(51) Int. Cl.[7] ............................................... H04L 12/16
(52) U.S. Cl. .................... 370/260; 370/395.43; 370/237
(58) Field of Search ................................. 370/260, 261, 370/228, 237, 395.2, 395.21, 252, 395.32, 395.1, 235, 395.43, 285, 263, 265, 266; 348/14.08, 14.09, 14.1, 14.12, 14.13, 14.14, 14.15, 14.11, 27, 384.1, 387.1, 404.1

(56) References Cited

U.S. PATENT DOCUMENTS

| | | | | |
|---|---|---|---|---|
| 5,687,095 A | * | 11/1997 | Haskell et al. ........... | 348/14.09 |
| 5,689,553 A | * | 11/1997 | Ahuja et al. ............... | 348/14.1 |
| 5,901,140 A | * | 5/1999 | Van As et al. ............... | 370/236 |
| 5,926,208 A | * | 7/1999 | Noonen et al. ........... | 348/386.1 |
| 6,011,780 A | * | 1/2000 | Vaman et al. ............... | 370/237 |
| 6,026,080 A | * | 2/2000 | Roy ........................... | 370/260 |
| 6,108,382 A | * | 8/2000 | Gringeri et al. ........ | 375/240.01 |
| 6,288,739 B1 | * | 9/2001 | Hales et al. ............. | 348/14.13 |

OTHER PUBLICATIONS

William Stallings, "ISDN and Broadband ISDN with Frame Relay and ATM", 1998, Prentice–Hall, Inc., 4th Edition, 99, 460–462.*

* cited by examiner

Primary Examiner—Chau Nguyen
Assistant Examiner—Nittaya Juntima

(57) ABSTRACT

An apparatus and method for providing multimedia conferencing services over an ATM network with an unspecified bit rate quality of service class. Because the signals of the unspecified bit rate multimedia conference will be dropped before those of any guaranteed quality of service conferences, a multimedia bridge monitors the ATM network for congestion. If congestion is detected, the multimedia bridge searches for alternate non-congested paths so that the UBR multimedia conference can be maintained without cell losses. If no non-congested paths are found, the multimedia bridge scales the video portion of the UBR multimedia conference signals so that the UBR multimedia conference can continue. The scaling is performed in accordance with user-defined parameters that result in a reduced bandwidth video signal that can be transmitted along the congested ATM network.

8 Claims, 3 Drawing Sheets

FIG. 3

| | Video Format Type 1 | | | ... | Video Format Type N | | |
|---|---|---|---|---|---|---|---|
| Description (300) | Bandwidth | Delay | MOS | ... | Bandwidth | Delay | MOS |
| USER 1: ADDRESS PARAMETERS: TELEPHONE NO. (555-999-1234), EMAIL ADDRESS, URL ADDRESS, ALIAS ADDRESS, SECURITY PARAMETERS, TRANSPORT [TCP/UDP] ADDRESS FOR AUDIO, VIDEO, DATA AND/OR SIGNALING, NETWORK ADDRESS [IP, ATM, AND/OR OTHER]  VIDEO VARIABLES PARAMETERS FOR SCALING: QUANTIZATION FACTOR, DCT COEFFICIENT REDUCT., COLOR REDUCTION, AND/OR OTHER COMBINATION | $B_{F_{11}}$ (10 MEGA-BITS PER SEC) | $D_{F_{11}}$ (150 MSECS) | $M_{F_{11}}$ (4.0) | ... | $B_{F_{N1}}$ | $D_{F_{N1}}$ | $M_{F_{N1}}$ |
| USER 2: ADDRESS PARAMETERS: ⋮ | $B_{F_{12}}$ (5 MEGA-BITS PER SEC) | $D_{F_{12}}$ | $M_{F_{12}}$ | ... | $B_{F_{N2}}$ | $D_{F_{N2}}$ | $M_{F_{N2}}$ |
| USER 3: ADDRESS PARAMETERS: ⋮ | $B_{F_{13}}$ (10 MEGA-BITS PER SEC) | $D_{F_{13}}$ | $M_{F_{13}}$ | ... | $B_{F_{N3}}$ | $D_{F_{N3}}$ | $M_{F_{N3}}$ |
| ⋮ | ⋮ | ⋮ | ⋮ | ... | ⋮ | ⋮ | ⋮ |

Columns 301 span the Video Format Type 1 sub-columns; columns 302 span the Video Format Type N sub-columns.

APPARATUS AND METHOD FOR PROVIDING MULTIMEDIA CONFERENCING SERVICES WITH AN UNSPECIFIED BIT RATE QUALITY OF SERVICE CLASS OVER AN ASYNCHRONOUS TRANSFER MODE NETWORK

This nonprovisional application claims the benefit of U.S. provisional application No. 60/112,566 entitled "Multimedia Conferencing Services with the Unspecified Bit Rate Quality-of-Service Class Over the ATM Network" filed on Dec. 16, 1998. The Applicant of the provisional application is Radhika R. Roy.

BACKGROUND OF THE INVENTION

1. Field of Invention

The present invention is directed to an apparatus and method for providing multimedia conferencing services with an unspecified bit rate (UBR) quality of service class over an asynchronous transfer mode (ATM) network.

2. Description of Related Art

Multimedia conferencing over an ATM network is generally provided with either a constant bit rate (CBR) quality of service class or a variable bit rate (VBR) quality of service class. The CBR class guarantees that the multimedia conferencing service will be provided at a peak cell rate (PCR), and the VBR class guarantees at least a minimum cell rate (MCR) for the multimedia conference. A cell is a packet of 53 bytes (i.e., 424 bits). Thus, a cell rate of 10 cells per second corresponds to a bit rate of 4240 bits per second. Because the CBR and VBR quality of service classes guarantee particular cell rates, the transmission of signals for those service classes are given priority over other ATM network communications. Therefore, the CBR and VBR quality of service classes guarantee a particular service quality, and thus, are relatively costly classes of service. Thus, new technology is needed to provide economical multimedia conferencing services over an ATM network with a satisfactory quality of service.

SUMMARY OF THE INVENTION

The invention provides an apparatus and method that provides economical multimedia conferencing services to multiple parties over an ATM network. Service satisfying different performance criteria may be provided to each party based on networking conditions beyond the control of the parties (e.g., availability of bandwidth, switches, circuits, buffers, and the like) or based on the preferences of the respective parties, as described in U.S. patent application Ser. No. 09/371,864, filed Aug. 11, 1999, which is incorporated herein by reference in its entirety.

Using the invention, multimedia conferencing services are provided at a UBR quality of service class. The UBR class does not guarantee any specific bandwidth over the ATM network nor does it provide any congestion control mechanisms. Further, in the event of network congestion, a service provider will start dropping cells from the UBR class multimedia conferences before dropping cells from CBR and VBR conferences. Therefore, the UBR class of service is very vulnerable to network congestion.

However, the UBR class of service is inexpensive to provide because there is no guaranteed cell rate. Thus, the UBR class of service is desirable as long as output quality can generally be maintained at or above a satisfactory level.

It is an object of the present to provide a UBR class of service that maintains a satisfactory output quality. Accordingly, once a UBR class multimedia conference is commenced, a multimedia bridge equipped with ATM network interfaces monitors the ATM network for congestion. If the multimedia bridge detects congestion along the ATM network paths used for sending and receiving the multimedia conference signals, the multimedia bridge either redirects the signals along another ATM network path capable of handling the signals or scales down the signals for transmission.

These and other features and advantages will be described in or are apparent from the following detailed description of the preferred embodiments.

BRIEF DESCRIPTION OF THE DRAWINGS

The preferred embodiments of the invention will be described with reference to the following figures, wherein like numerals designate like elements, and wherein:

FIG. 3 is a exemplary data structure of FIG. 1 which stores information related to performance parameters of the user devices.

DETAILED DESCRIPTION OF PREFERRED EMBODIMENTS

Figure 1:
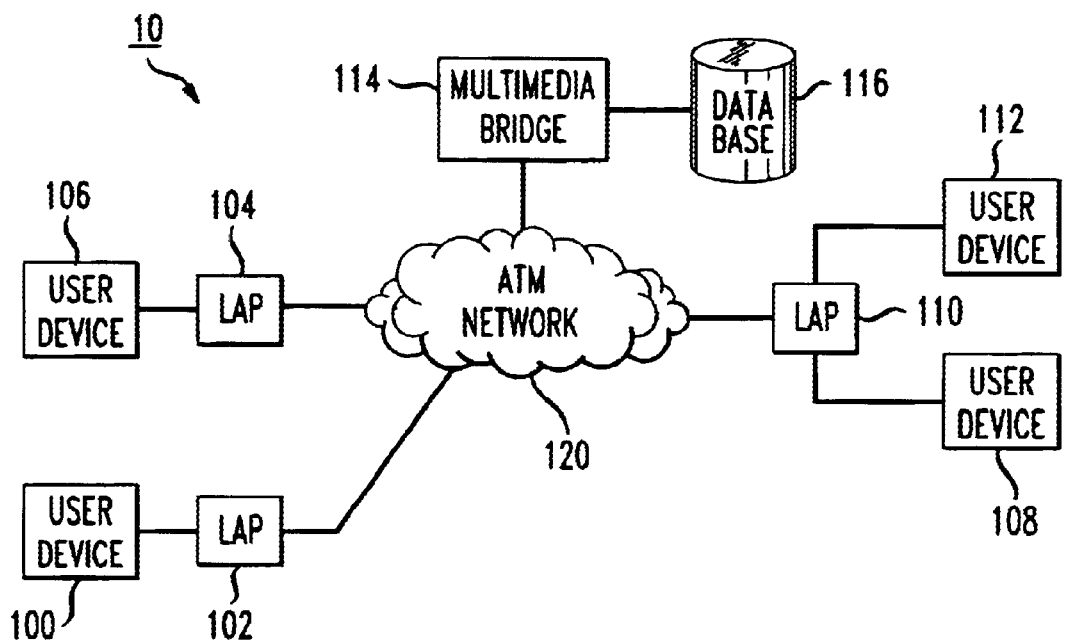
FIG. 1 is an exemplary block diagram of a multimedia conferencing system in which the invention operates.

FIG. 1 is an exemplary block diagram of a system 10 in which the invention operates. The system 10 includes a plurality of user devices 100, 106, 108 and 112 in communication with at least one ATM network 120 through Local Access Providers (LAPs) 102, 104 and 110. The user devices 100, 106, 108, and 112 communicate with one another through the ATM network 120. The ATM network 120 is further in communication with a multimedia bridge 114. The multimedia bridge 114 is in communication with a database 116.

If an operator of the user device 100 wishes to communicate with the user devices 106, 108, 112 at a UBR quality of service class, the operator need only activate the user device 100 and send start-up signals to the multimedia bridge 114 including information regarding the destination addresses, for example the telephone number, Universal Resource Locator (URL), TCP/IP address, and the like, of the user devices 106, 108, 112.

The multimedia bridge 114 retrieves profile information from the database 116 corresponding to the user devices 100, 106, 108, 112, including the quality of service class to be provided (i.e., UBR quality of service). Alternatively, the quality of service class can be designated in the start-up signals from the user device 100.

The multimedia bridge 114 sends start-up requests to the user devices 106, 108, 112. The user devices 106, 108, 112 respond with a start-up signal back to the multimedia bridge 114. The multimedia bridge establishes a multimedia conference connection at the UBR quality of service class among the user devices 100, 106, 108 and 112.

The user devices 100, 106, 108 and 112 may be any devices that allow for the transmission of signals over communications links. For example, the user devices 100, 106, 108 and 112 may be any devices capable of sending and receiving multimedia conferencing services such as computers, video telephones, video conference apparatuses, and the like.

The user devices 100, 106, 108 and 112 are in communication with the network 120 through LAPs 102, 104 and 110 over communications links. These communications links may be any type of connection that allows the transmission of information. Some examples include conventional telephone lines, fiber optic lines, direct serial connection, cellular telephone connections, hybrid-fiber-coax (HFC), satellite communication links and the like.

The user devices 100, 106, 108 and 112 send communication signals to one another over the communications links through LAPs 102, 104 and 110. The LAPs 102, 104 and 110 are devices that provide an interface to the network 120. The LAPs 102, 104 and 110 may include Local Exchange Carriers (LECs), Internet Access Providers (IAPs), satellite base stations, and the like.

The communication signals are received by the network 120 and are routed in the network 120 to the destination user device. The routing may be performed by the link layer (e.g., ATM) entities, which are generally known in the art.

The network 120 may be a single network or a plurality of networks of the same or different types. For example, the network 120 may include a local telephone network in connection with a long distance network. Further, the network 120 may be a data network or a telecommunications network in connection with a data network.

The network 120 is further in communication with at least one multimedia bridge 114. The multimedia bridge 114 controls the setting of performance parameters used during the communication between a source user device (i.e., the user device initiating the communication) and destination user devices, as described below.

When the operator of a user device, for example user device 100, sends start-up signals to the multimedia bridge 114, including the identity of the user device 100 and of the user devices with which communication is sought, for example, user devices 106, 108 and 112, the multimedia bridge 114 receives the signals from the user device 100. The multimedia bridge 114 retrieves profile information from the database 116 corresponding to the identity of the user device 100 and/or the destination user devices 106, 108 and 112, as well as information regarding the quality of service class to be provided (i.e., UBR quality of service class). Alternatively, the quality of service class can be designated in the start-up signals from the user device 100.

Based on the profile information, the multimedia bridge 114 sends start-up requests to the necessary user devices 106, 108 and 112 that are to be involved in the multimedia conference. If the start-up requests are accepted, the user devices 106, 108 and 112 send start-up signals back to the multimedia bridge 114. The multimedia bridge 114 then establishes the UBR quality of service class multimedia conference among the user devices 100, 106, 108 and 112 with the help of ATM network interfaces.

For multimedia conferencing in UBR mode, no guarantee of any performance parameters is provided. For example, a user can select any bandwidth that will be considered as the peak cell rate (PCR). Although no guarantee of any bandwidth is provided, a user may be charged for the bandwidth that has been successfully transmitted. A user can negotiate to send video and other media at any given rate although no guarantee for the bandwidth is provided in the ATM network layer.

Each user may prefer to receive media at a certain bandwidth for a given multimedia conference over the ATM network, which may or may not be the same for all communicating users of the multimedia conference. In this situation an adaptive function is needed to scale the media. This adaptive function may be located in the user devices 100, 106, 108 and/or 112. However, for purposes of description, it is assumed that the multimedia bridge 114 has this performance matching adaptive function. As a result, it is assumed that all calls, whether point-to-point or point-to-multipoint, are routed through the multimedia bridge 114.

If a user of the user device 100 decides to initiate a multimedia conference call with user devices 106, 108, and 112, the user device 100 sends start-up signals, i.e. a multimedia conference request, to the multimedia bridge 114 with the required multimedia conference information. The multimedia conference information may include, for example, the addresses of user devices 100, 106, 108, and 112 and corresponding ATM network layer performance related parameters of available bit rate (ABR) and peak cell rate (PCR) of each of the user devices 100, 106, 108, and 112 in accordance with the ATM Forum and ITU-T standards. The multimedia conference bridge 114 may then retrieve profile information from the database 116 for each user device 100, 106, 108, and 112.

The multimedia bridge 114 may then examine whether the multimedia conference request is valid and/or has proper authorization. If the multimedia conference request is not valid and/or not authorized, the multimedia bridge 114 sends a rejection message to the user device 100. If the multimedia conference request is valid, the multimedia bridge 114 sends an invitation, i.e. a start-up request, to the user devices 106, 108, and 112.

The user device 106, 108 and 112 examine all the criteria for joining the multimedia conference call including the performance parameters. Each user device 106, 108, and 112 will then communicate with the multimedia bridge 114, i.e. send start-up reply signals, identifying the desired criteria, including the performance parameters, for their joining the multimedia conference.

The multimedia bridge 114 may then examine the start-up reply of each user device 106, 108, and 112, and adapt the multimedia conference service to the desired UBR performance criteria of each user device 100, 106, 108, and 112 in accordance with the techniques described in this invention. The multimedia bridge 114 may then prepare itself to bridge this multimedia conference call in accordance with the criteria agreed upon by each user device 100, 106, 108, and 112. The multimedia bridge 114 may then send a reply back to the user devices 100, 106, 108, and 112 confirming that the multimedia conference call has been accepted. After receiving the confirmation of the acceptance of the multimedia conference call, each of the user devices 100, 106, 108, and 112 may start to communicate with one another using audio, video, and/or data as desired.

It should be noted that all parties may not have the same UBR performance parameters. For example, user device 100 may send the video with peak cell rates (PCR) of 23.6 ATM cells per second (that is, 10 megabits per second (Mbps)). However, the other users may not be ready to accept this PCR rate because of cost or other practical considerations. That is, each user device 106, 108, and 112 may prefer other bandwidth criteria that best suits their requirements. For example, one may choose the PCR rate of video at 1 Mbps and another may choose video having a PCR of 0.5 Mbps. However, the receiving user device cannot expect better performance or more bandwidth than the capabilities or selected performance parameters of the sending user device.

It may also so happen that some of the user devices 106, 108, and 112 may not be willing to join the multimedia conference call. The respective user devices 106, 108, and 112 that declined to join the multimedia conference call are not connected by the multimedia bridge 114, and information to this effect may be transmitted to the user device 100.

If needed, the multimedia bridge 114 may store detailed information of the multimedia conference call, in database 116 or an associated memory for later use, such as for billing purposes.

The invention may also include the capability to provide multimedia conferencing service to multiple parties where the performance of the service for each of the parties may be different, i.e., multimedia conferencing service with selective performance parameters, as disclosed in the incorporated U.S. patent application Ser. No.09/371,864. If multimedia conferencing service with selective performance parameters is included, the profile information may also include default performance parameters for each user device 100, 106, 108 and 112 as described in the above incorporated U.S. patent application Ser. No. 09/371,864.

Once the multimedia conference is established, the multimedia bridge 114 monitors the network for congestion. In the presence of congestion, the UBR quality of service multimedia conference signals will not be guaranteed. Thus, the signals for any multimedia conferences provided at a guaranteed quality of service will be prioritized and the UBR conference signals will be the first to be dropped.

Particularly, the multimedia bridge 114 monitors the paths, i.e. communication links, being used for communication among the user devices 100, 106, 108 and 112. It has been explained earlier that the multimedia bridge 114 includes an ATM network interface 202, controller 201, database interface 203, and media bridge 205. The ATM network 120 includes ATM switches that implement the UBR-based performance mechanisms. That is, no performance guarantee either for the bandwidth or for any other performance parameters are provided. However, the ATM switches interconnect all users that participate in the multimedia conference call. These switches also implement ATM standard-based control mechanisms defined by the ATM Forum and/or ITU-T.

According to these ATM standards, congestion control schemes are provided to all other kinds of traffic (e.g., constant bit rate (CBR), variable bit rate (VBR), available bit rate (ABR)) except UBR traffic. That is, no standard has been defined for congestion control of UBR traffic, and UBR traffic is dropped first at the time of congestion until the congestion is over. The sources that are using UBR-based traffic mechanisms are not provided any feedback about the information of the network congestion. So, the application that uses the UBR mechanisms cannot take action to prevent the loss of the traffic. For example, if the multimedia conferencing is offered using the UBR performance mechanisms, users will suffer with unpredictable consequences.

In this invention, a mechanism has been developed to detect whether congestion is eminent or has occurred for the UBR traffic so that the source can take the appropriate actions to prevent congestion through scaling the bandwidth and other performance parameters. The mechanism includes monitoring the inter-cell gap time of the ATM cell. A message can consist of multiple cells. Two cells leaving the source consecutively may arrive at the destination ATM switch with a time gap between them. This is called inter-cell time. By assuming the path between a source-destination pair is fixed for cells of the same message, the link capacity C for every link on the path is the same, and the link utilization is a constant ρ on the path, the average inter-cell gap time or delay T of a path in the network consisting of n hops, or links may be expressed as:

$$T=[\rho(1-\rho^{n-1})]/[(1-\rho)\mu C],$$

where ρ=link utilization (e.g., 20 kbps/64 kbps, if 20 kbps is used on a 64 kbps line) and $\mu$=1/ATM cell size (e.g., if ATM cell size is 424 bits, then $\mu$=1/424).

See Cole, G. D., "Computer Network Measurements: Techniques and Experiments," Engineering Report No. UCLA-ENG-7165, University of California, Los Angeles, Calif., 1971, which is hereby incorporated by reference in its entirety.

In this invention, this formula has been extended to determine the congestion level of the ATM network for the UBR traffic since the present ATM standard does not provide any mechanisms to monitor the congestion for the UBR traffic, and the multimedia conferencing service using the UBR performance criteria for the ATM network will be controlled accordingly. According to this invention, the ATM inter-cell gap or delay T for the UBR traffic may be measured at the ATM layer interfaces (e.g., the network interface 202 of the multimedia bridge 114, ATM switches, etc.), and an algorithm may be used to measure the congestion level for the UBR traffic to control the multimedia conferencing.

There can be further modifications of the parameters to calculate the average number of hops and the average line utilization. For example, the entire network statistics can be included to find the weighted average.; This inter-cell gap or delay can also be termed as jitter or delay variation.

ATM Forum's and ITU-T's standards do not provide any mechanisms to monitor or prevent congestion for the UBR traffic. This invention provides a mechanism to perform this. For example the ATM inter-cell delay measured in any ATM interface for any connection of the UBR traffic may have the delay threshold level T1 through T6 where T1 is the highest level inter-cell gap or delay threshold and T6 is the lowest level inter-cell gap or delay threshold. The invention monitors the ATM inter-cell gap or delay threshold level for the UBR traffic in the following manner:

1. If the inter-cell gap or delay is greater than T2, the ATM network is heavily congested and actions need to be taken to relieve the ATM network congestion. Under this condition, the ATM network has already started dropping UBR cells. That is, the ATM UBR cells will be dropped first if the UBR inter-cell gap or delay exceeds T2 because of the higher load in the ATM network 120. This condition of the ATM network 120 congestion is monitored and reported to the UBR-based user devices that are participating in the multimedia conferencing to indicate that the ATM network is heavily congested, and appropriate measures need to be taken by the sources.

2. If the ATM UBR inter-cell gap or delay threshold is greater than or equal to T3, but less than T2, a high load condition in the ATM network is detected and the ATM network is determined to be in a congested state. Under this condition, the UBR cells are about to be dropped. In this situation, the UBR user devices are advised to reduce their bit rate to avoid dropping of UBR packets due to the network congestion. This condition is considered the last marginal condition before the UBR cells begin to be dropped.

3. If the ATM UBR inter-cell gap or delay is greater than or equal to T4, but less than or equal to T3, the ATM network load level is considered to be normal. No congestion control mechanisms are applied in this situation for the UBR traffic.

4. If the ATM UBR inter-cell gap or delay is greater than or equal to T5, but less than T4, the network is considered lightly loaded. An appropriate mechanism may used to increase UBR traffic to utilize the spare capacity of the ATM network. For example, a service provider may indicate that it is safe to send more UBR traffic at this period and proper price-performance incentives can be provided.

5. If the ATM UBR inter-cell gap or delay is less than T5, it may be determined that the ATM network is very lightly loaded. In this situation, a service provider may provide more price-performance incentives to utilize the severely under utilized ATM network.

Thus, the present invention exploits the ATM network's UBR mechanisms to the advantage of the multimedia conferencing services with selective performances for each conferee. The simplicity of the UBR traffic is that no control is required at the ATM network level other than the signaling at the PCR rate without any constraints. The ATM UBR traffic does not care whether there are enough resources within the ATM network to accommodate the call. As soon as the application decides to send something, it does not care or negotiate with the ATM network layer to send the traffic. This simplicity of the UBR-based conferencing services for the normal traffic condition may be very attractive because it provides significant price-performance trade-offs compared to that of the constant bit rate (CBR), available bit rate (ABR), variable bit rate (VBR), or the real-time variable bit rate (rt-VBR) services. In addition, there is flexibility for the UBR-based multimedia conferencing services in view of the ATM network congestion because some thresholds may be applied in throttling the traffic.

If the multimedia bridge 114 detects congestion along any of the paths being used for the UBR multimedia conference, the multimedia bridge 114 can avoid cell losses either by redirecting the signals along an alternate network path or by scaling down the video signals as necessary to accommodate the higher network constraints. As the multimedia bridge 114 continues to monitor the ATM network for congestion, the multimedia bridge 114 may redirect the signals along the original network path if the congestion ceases. The UBR multimedia conference continues until an end condition occurs.

Although the multimedia conference may include all types of media, i.e., video, audio and data, the operation of the invention will be described below primarily with respect to the transmission of video signals because the video signals are bandwidth intensive, as compared to the audio and data portions of the multimedia conference. For video signals, the performance parameters that determine the signal quality may include the bandwidth, bit rate, allowable delay, allowable jitter, and the like, of the video signals of the multimedia conference.

In the case of audio information, the multimedia bridge 1 14 sums up all audio from all sources except the source to which the bridged audio is sent. In the case of data, all user devices 100, 106, 108 and 112 will be sending the data in an ordered form in accordance with certain schemes and protocols (e.g., ITU-T's T.120-series recommendations). The data from the user devices 100, 106, 108 and 112 is combined together accordingly and the resultant data is sent back by the multimedia bridge 114 to the designated recipients determined in accordance with the agreed upon schemes.

Figure 2:
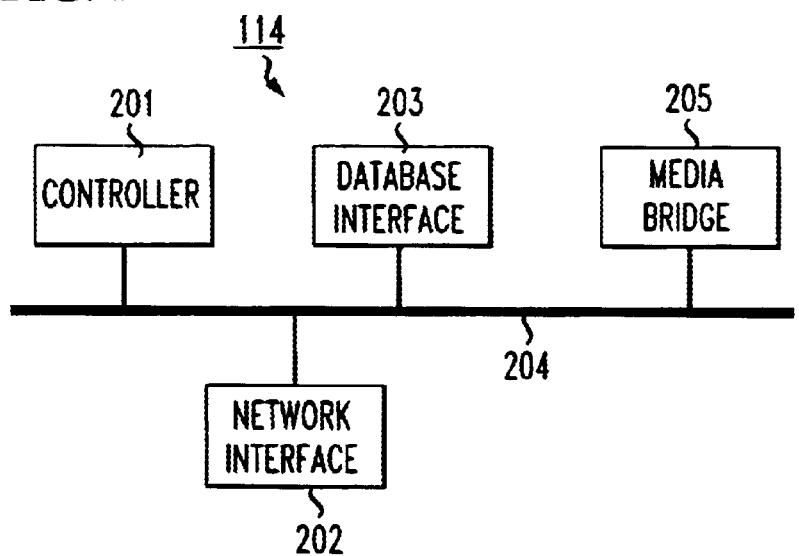
FIG. 2 is a block diagram of the multimedia bridge of FIG. 1.

FIG. 2 is a block diagram of the multimedia bridge 114 of FIG. 1. The multimedia bridge includes a controller 201, a network interface 202, a database interface 203, media bridge 205 and a bus 204. The controller 201 controls the operation of the multimedia bridge 114 and directs communication between itself and the interfaces 202 and 203. The network interface 202 provides a communication pathway between the controller 201 and the network 120. The database interface 203 provides a communication pathway between the controller 201 and the database 116. The media bridge 205 bridges media information (audio, video and/or data) between the user devices 100, 106, 108 and 112. The controller 201, interfaces 202 and 203, and media bridge 205 communicate with one another over the bus 204.

The operation of the multimedia bridge 114 will now be explained with reference to an example of a first embodiment of the present invention. In this example, it is assumed that three user devices 100, 106 and 112 are involved in the multi-party UBR quality of service class multimedia conference. However, the example operation is also applicable when there are any number of user devices involved in an UBR multimedia conference.

When an operator of the user device 100 wishes to communicate with the operator of the user devices 106 and 112, for example, the operator of user device 100 enters the address of the user devices 106 and 112 into the user device 100. The user device 100 transmits start-up signals for an UBR quality of service class multimedia conference to the multimedia bridge 114. The start-up signals contain identification information identifying the source user device 100 and the destination user devices 106 and 112. The controller 201 of the multimedia bridge 114 receives the start-up signals through the network interface 202. The controller 201 then retrieves profile information, including the UBR quality of service class and the minimum cell rates corresponding to the destination user devices 106 and 112, from the database 116 through the database interface 203.

The controller 201 then sends start-up requests to the user devices 106, 108, 112. If the user devices 106, 108 and 112 are connected to the ATM network and are not busy, the user devices 106, 108 and 112 accept the requests by sending start-up signals to the controller 201, and the UBR quality of service class multimedia conference is established. The controller 201 can control what video is sent to which user device based on conventional switching principles and/or the choices made at each of the user devices 106 and 112. For example, the party operating user device 100 may choose to receive video of the speaker only, the party operating user device 106 may choose to receive video from all user devices, and the party operating user device 112 may choose to receive video from all user devices except his/her own.

Once the UBR multimedia conference is established, the controller 201 monitors the network paths used to send and receive the multimedia signals. If the controller 201 detects congestion in any of the network communication paths during the UBR multimedia conference, the controller 201 either redirects the multimedia signals along alternate, non-congested network paths or scales down the video signals by adjusting the performance parameters to meet the reduced capability of the communication paths so as to maintain the UBR multimedia conference without disconnecting the user devices 100, 106, 112.

The controller 201 detects the ATM network level congestion through monitoring the UBR traffic's inter-cell gap or delay of the ATM interface cooperating with the ATM switches of the network, as described above. Once the congestion in the ATM network is detected, the next step is to scale down the traffic from the affected user devices 100, 106, 108 and 112. The controller 201 receives information reported back by the ATM switches that there is congestion in a particular path, and the corresponding user devices 100, 106, 108 and 112 that are using that path are identified by the controller 201.

The controller 201 may then instruct the media bridge 205 to scale down the video for the user devices 100, 106, 108 and 112 that are affected by the congestion. The amount that needs to be scaled down to avoid the congestion may be determined in many ways. For example, the amount of inter-cell gap or delay may provide a measure of the loading of the ATM network. Accordingly, a certain percentage of loading for each user device 100, 106, 108 and 112 can be scaled. The exact algorithm is similar to that described above with regard to measuring the inter-cell gap or delay threshold.

This algorithm provides a dynamic scheme for real-time congestion control. This control can be used to determine how the video parameters need to be changed to achieve the desired performance level. A statistically defined method can also be stored in a database profile for each user device 100, 106, 108 and 112 identifying how each user device 100, 106, 108 and 112 prefers the scaling down of the video bandwidth to be accomplished. Other methods or variations of the above methods may be used without departing from the spirit and scope of the invention.

If the multimedia bridge 114 cannot find an alternate path without congestion, the video signals are scaled down by modifying parameters that define the video signal, such as the frame rate, the quantization, the discrete cosine transform (DCT) coefficients, the color and the like. The scaling of the video may be performed by the media bridge 205 under the direction of the controller 201 working cooperatively with the database interface 203 and network interface 202.

As an example, assume the multimedia bridge 114 is transmitting video signals with ten megabits of bandwidth to user device 100 at a frame rate of 30 frames per second. If the network connection becomes congested and no alternate path without congestion exists, the multimedia bridge may need to scale down the video signal, e.g., reduce the video signal to five megabits of bandwidth. In order to send the same video signal at the lower bandwidth, the multimedia bridge 114 needs to scale down the video signal. One option for scaling down the video signal may be to reduce the frame rate to 15 frames per second.

A second option may be to requantize the video signal. Requantization would entail reducing the number of bits used to represent the video signal. For example, an analog signal could be requantized to a target bit length, or a digital video signal could be reduced from a 16 bit representation to an 8 bit representation.

Alternatively, the color characteristics of the video signal may be reduced. For example, the multimedia bridge 114 can remove all chrominance information or all chrominance information except the direct current (DC) color information.

Another option may be to reduce the number of DCT coefficients used in the processing the video signal. The International Standard Organization for Standards (ISO) has standardized the Joint Photographic Expert Group (JPEG) based for coding of images. In motion JPEG, as explained in the incorporated U.S. patent application Ser. No. 09/371, 864, JPEG-based video images are sent at a certain rate (e.g., 5-, 10-, 15-, 20-, 25-, or 30 frames per second). According to that scheme, images can be analyzed in the frequency domain using the cosine transform. The cosine transform is limited to 64 coefficients which are known as the discrete cosine transform (DCT).

Each coefficient carries a certain amount of image information that can be used to reproduce the original image. The more coefficients that are used, the better the image quality will be. However, more coefficients mean more bandwidth requirement as well. There can be many trade-offs to choose certain combinations of DCT coefficients to have certain subjective qualities known as the Mean Opinion Scores (MOSs). Thus, the scaling of the video bandwidth can also be done based on the selection of the DCT coefficients.

Of course, the multimedia bridge 114 can modify any combination of one or more of the above-described parameters. Further, the parameters used by the multimedia bridge 114 to scale down the video signal may be set as default parameters, system-dependent parameters or user-preferred parameters.

The controller 201 continues the multimedia conference by receiving the video from the initiating user device 100, scaling the video as necessary and transmitting the video to the destination user devices 106 and 112. The controller 201 continues to monitor the transmission of media to and from the user devices 100, 106 and 112 and detects network congestion until the UBR multimedia conference is terminated.

For example, if the controller 201 detects congestion in the network connection of user device 106 that reduces the available amount of bandwidth, and the multimedia conference signals cannot be redirected to an alternate path, the controller 201 may prompt each user device 100, 106 and 112 as to whether each user device 100, 106 and 112 wants to maintain the multimedia conference at a reduced quality of performance or whether the user devices 100, 106 and 112 wish to terminate the conference. For example, the controller 201 may send a message such as "Unable to meet selective performance parameters. Do you want to continue conference?"

If the operator of each user device 100, 106 and 112 chooses to continue the multimedia conference, user devices 100 and 112 receive a video signal of reduced quality and the controller 201 scales-down the video signals being sent to user device 106 to meet the reduced bandwidth availability. The video parameters to be adjusted to scale-down the video signals and continue the conference may be set in the default field 302 of the data structure in FIG. 3 or may be a generally set default parameters of the multimedia bridge 114. The default parameters will generally be set to provide the least degradation of video quality, the least processing time, or the like. However, any parameter may be set as the default.

The "unable to meet selective performance parameters" message may further provide a listing of the parameters that are adjustable to maintain the conference and request that the user devices 100 select a parameter to adjust. The process may be repeated until a parameter is chosen and the continuation of the conference is enabled or until the problematic user device 100, 106 or 112 discontinues the conference.

The messages sent to the user device 100 may be in the form of graphical messages to be displayed, such as text and/or graphics, audible messages, or a combination of graphical and audible messages. Responses to the messages may be entered through the user device 100 by using a user interface such as a keyboard, microphone, speech recognition device, pointing device, telephone keypad, telephone handset, and the like.

FIG. 3 is an example of a data structure of the database 116 according to the first embodiment. As shown in FIG. 3, the data structure contains a listing of destination information with video variable parameters for preferences of scaling 300, a listing of their performance parameters containing bandwidth, delay and MOS of PCR for each video format type 301 corresponding to each of the destinations 300. Thus, when the multimedia bridge 114 retrieves profile information from the database 116 corresponding, for example, to the destination user device number 999-123-4567, the frame rate scaling parameter is retrieved.

As a practical example of the operation of the multimedia bridge 114, consider three persons, Lisa, Michael, and Nicolas, wishing to communicate with each other in an UBR quality of service class multimedia conference. Lisa initiates the communication by turning on the user device 100 and sending signals to the multimedia bridge 114, including identification information for Michael's and Nicolas' user devices 106 and 112.

The signals sent from Lisa's user device are routed by the network 120 to the multimedia bridge 114. The multimedia bridge 114 receives the signals from Lisa's user device and retrieves information from the database 116 corresponding to Michael's and Nicolas' user devices 106 and 112 and specifying a UBR quality of service class. The multimedia bridge 114 then sends a start-up request to Michael's and Nicolas' user devices 106 and 112. Michael's and Nicolas' user devices 106 and 112 send signals to the multimedia bridge 114 accepting the start-up request. Thus, the multimedia bridge 114 completes the communication connection and initiates the UBR multimedia conference.

The multimedia bridge 114 then carries on the multimedia conference while monitoring the transmissions between the user devices 100, 106 and 112 over the ATM network 120, or networks, for congestion or other problems that diminish the video quality. If the multimedia bridge 114 detects congestion along the paths being used for communications among the user devices 100, 106 and 112, the multimedia bridge 114 searches for an alternate path with no congestion, or at least lower congestion that would provide the requisite signal quality of the multimedia conference, the multimedia bridge 114 redirects the multimedia signals along the alternate path to continue the multimedia conference.

If congestion appears in the network between Nicolas' end user device 112 and the multimedia bridge 114 and the multimedia bridge 114 cannot find an alternate path with less congestion that would provide the requisite signal quality, the multimedia bridge 114 notifies Lisa, Michael and Nicolas that Nicolas' video signal quality will be reduced. Alternatively, if the multimedia bridge sends and receives signals to and from Nicolas on different paths, and if the path with congestion is the path sending signals to Nicolas, the multimedia bridge 114 may only notify Nicolas that his video signal quality will be reduced.

The multimedia bridge 114 then prompts Lisa, Michael and Nicolas as to whether they wish to continue or terminate the conference. If they wish to continue the conference, the multimedia bridge 114 will need to scale down the video signals sent from Lisa and Michael to Nicolas and the video signals from Nicolas will be transmitted at a lower quality. The multimedia bridge 114 can scale the video signals in accordance with default parameters, or the multimedia bridge 114 may prompt Nicolas to select which parameters he wishes to use to scale down the video signals. Alternatively, Nicolas may elect to terminate the multimedia conference and the conference will continue with only Lisa and Michael.

Figure 4:
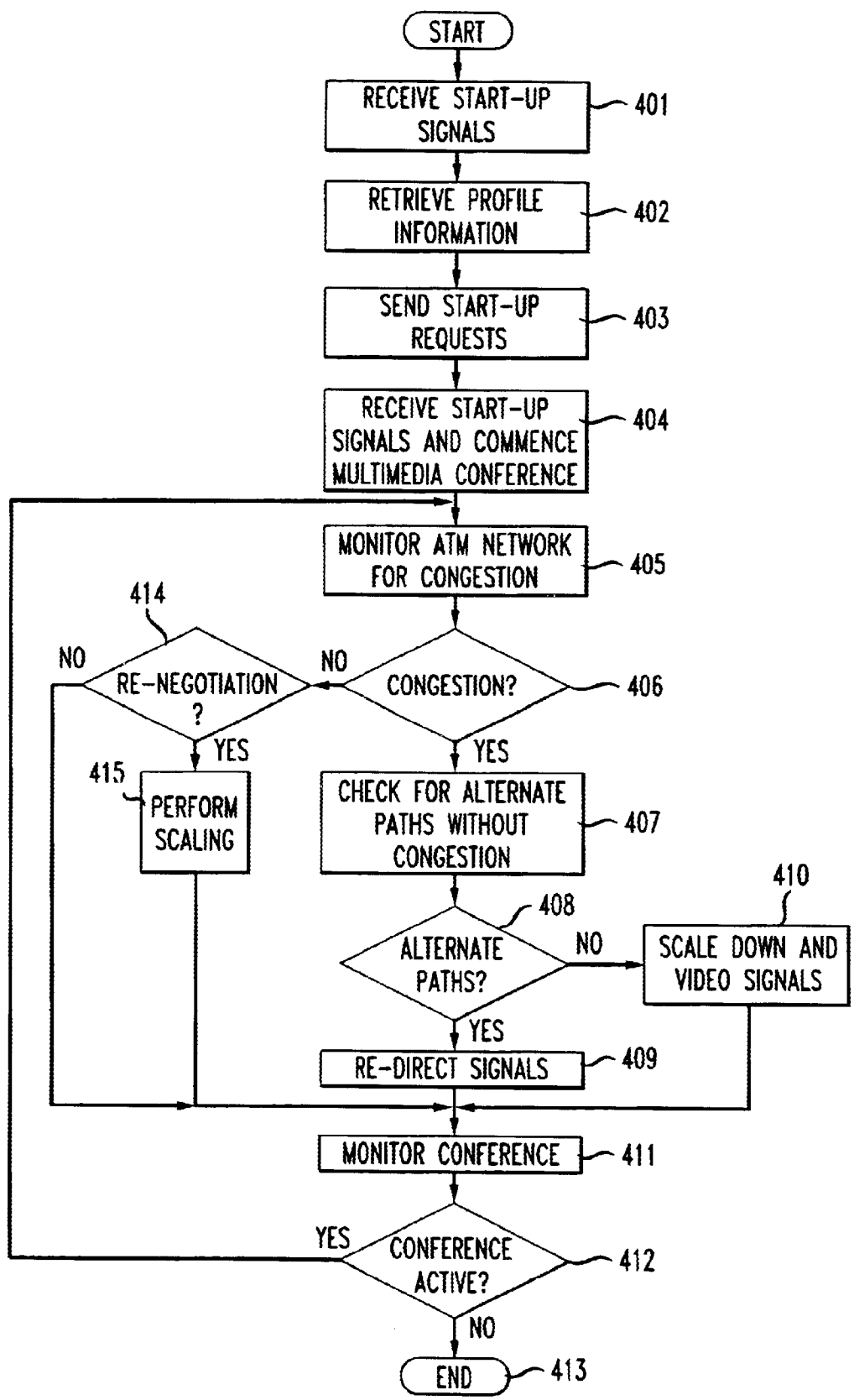
FIG. 4 is a flowchart of the operation of the invention according to an exemplary embodiment.

FIG. 4 is a flowchart of an exemplary operation of the multimedia bridge 114 according to a first exemplary embodiment. In step 401, the controller 201 receives start-up signals through the network interface 202 from a source user device 100, for example, and goes to step 402. The start-up signals include identifying information that identifies the source and destination user devices 100, 106 and 112, for example. In step 402, the controller 201 retrieves profile information from the database 116 through database interface 203 corresponding to the source and destination user devices 100, 106 and 112 identified in the start-up signal, as well as information pertaining to the quality of service class to be provided and goes to step 403.

In step 403, the controller 201 sends start-up requests to the destination user devices 106 and 112 and continues to step 404. In step 404, the controller 201 receives start-up signals from the destination user devices 106 and 112 in response to the start-up requests, commences the UBR multimedia conference, and determines the video signals to be transmitted to and from each of the user devices and goes to step 405.

In step 405, the controller 201 monitors the ATM network 120 for congestion along the paths used for sending and receiving signals for the multimedia conference and continues to step 406. The operation for monitoring and detecting congestion has been described above. In step 406, if the controller 201 detects congestion along any of the paths used for sending and receiving signals for the multimedia conference, the controller 201 continues to step 407; otherwise, the controller 201 jumps to step 414. In step 414, the controller 201 determines whether any re-negotiation is requested by any of the user devices. If there is a request for re-negotiation, the controller 201 goes to step 415 and sets up a negotiation with the requesting user device for scaling up or scaling down the bandwidth, and then goes to step 411. On the other hand, if no re-negotiation is requested by any user device, the controller 201 goes to step 411.

In step 407, the controller 201 determines whether any alternate network paths exist that enable transmission of the multimedia signals without a loss of quality and continues to step 408. In step 408, if the controller 201 finds an alternate path that enables transmission of the multimedia signals without a loss of quality, the controller 201 continues to step 409; otherwise, the controller goes to step 410.

In step 409, the controller 201 redirects the multimedia signals along an alternate path that enables transmission of the multimedia signals without a loss of quality and continues to step 411.

In step 410, the controller 201 scales down the video signals and provides each user device with video signals that are scaled down in accordance with the signal constraints caused by the network congestion. Control continues to step 411.

In step 411, the controller 201 monitors whether the multimedia conference is active and continues to step 412. In step 412, if the multimedia conference is still active, the controller 201 returns to step 405; otherwise the controller goes to step 413 and ends the operation. The end condition may be, for example, the disconnection of all but one of the user devices 100, 106 or 112, and the like.

This invention provides a relatively high quality of service class for multimedia conferencing at a relatively inexpensive cost. Further, if network congestion is detected, the invention prevents undesirable cell loss to each of the user devices of the multimedia conference. In addition, if the, multimedia signal needs to be scaled down due to network congestion constraints, only the signal of those user devices whose paths are experiencing congestion are affected.

As shown in FIG. 2, the method of this invention is preferably implemented on a programmed processor. However, the multimedia 114 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device capable of implementing the flowchart shown in FIG. 4 can be used to implement the multimedia bridge 114 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for operating a multimedia bridge of a type that provides a multimedia conference among a plurality of user devices over a packet network, the method comprising:

providing multimedia signals among the plurality of user devices via the network using a grade of service for which the network does not provide congestion control;

detecting congestion along paths of the network used to provide the multimedia signals; and avoiding packet loss to the multimedia signals based on the detected congestion, wherein said congestion is detected by monitoring a time gap between consecutive packets leaving a particular user device.

2. The method of claim 1 wherein said packet network is an ATM network and said packets are ATM cells.

3. The method of claim 1 wherein said time gap for an individual one of said paths is an average gap time $$T=[\rho(1-\rho^{n-1})]/[(1-\rho)\mu C],$$

where n is a number of links in the path, C is a link capacity for the links of the path, $\rho$ is a link utilization on the path and $1/\mu$ is a size of each packet, measured in bits.

4. A multimedia bridge for providing a multimedia conference among a plurality of user devices over a packet network, comprising:

a controller; and a memory having stored therein program instructions which, when executed by the controller, provide multimedia signals among the plurality of user devices via the network using a grade of service for which the network does not provide congestion control, detect congestion along paths of the network used to provide the multimedia signals, and avoid packet loss to the multimedia signals based on the detected congestion, wherein congestion is detected by monitoring a time gap between consecutive packets leaving a particular user device.

5. The invention of claim 4 wherein said time gap for an individual one of said paths is an average gap time $$T=[\rho(1-\rho^{n-1})]/[(1-\rho)\mu C],$$

where n is a number of links in the path, C is a link capacity for the links of the path, $\rho$ is a link utilization on the path and $1/\mu$ is a size of each packet, measured in bits.

6. A method for use by apparatus connected to, but not forming a part of, a packet network, the method comprising:

monitoring packets being carried along paths within said packet network between at least two user devices to detect congestion along at least one of said paths, and responsive to detection of congestion along at least one of said paths, avoiding loss of said packets, wherein said monitoring for congestion is carried out by monitoring a time gap between consecutive packets leaving a particular user device.

7. The invention of claim 6 wherein said packet network is an ATM network and said packets are ATM cells.

8. The invention of claim 7 wherein said time gap for an individual one of said paths is an average gap time $$T=[\rho(1-\rho^{n-1})]/[(1-\rho)\mu C],$$

where n is a number of links in the path, C is a link capacity for the links of the path, $\rho$ is a link utilization on the path and $1/\mu$ is a size of each cell, measured in bits.

* * * * *